United States Patent
Yu

(10) Patent No.: US 6,894,755 B2
(45) Date of Patent: May 17, 2005

(54) LIQUID CRYSTAL DISPLAY DEVICE INTEGRATING DRIVING CIRCUIT ON MATRIX SUBSTRATE

(75) Inventor: Jian-Shen Yu, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 99 days.

(21) Appl. No.: 10/410,769

(22) Filed: Apr. 10, 2003

(65) Prior Publication Data

US 2004/0090583 A1 May 13, 2004

(30) Foreign Application Priority Data

Nov. 11, 2002 (TW) .......................... 91133001 A

(51) Int. Cl.⁷ .......................... G02F 1/1343; G09G 3/30
(52) U.S. Cl. .......................... 349/139; 349/143; 345/80
(58) Field of Search .................. 349/139, 143, 349/149, 151, 153, 190; 345/80, 90, 98

(56) References Cited

U.S. PATENT DOCUMENTS

| 6,246,460 B1 | * | 6/2001 | Young ...................... 349/151 |
| 6,295,107 B1 | * | 9/2001 | Watanabe et al. .......... 349/95 |
| 6,424,400 B1 | * | 7/2002 | Kawasaki ................... 349/149 |
| 6,583,829 B2 | * | 6/2003 | Ootsu et al. ................ 349/43 |

* cited by examiner

Primary Examiner—Tarifur R. Chowdhury
Assistant Examiner—Mike Qi
(74) Attorney, Agent, or Firm—Fish & Richardson P.C.

(57) ABSTRACT

A liquid crystal display (LCD) device integrating driving circuit on an active-matrix substrate. A common electrode disposed on a counter substrate has an opening slit corresponding to a clock line disposed on the matrix substrate, thereby eliminating parasitic capacitance between the clock line and the common electrode.

13 Claims, 2 Drawing Sheets

LIQUID CRYSTAL DISPLAY DEVICE INTEGRATING DRIVING CIRCUIT ON MATRIX SUBSTRATE

CLAIM OF PRIORITY

Under 35 USC 119, this application claims the benefit of a foreign priority application filed in Taiwan, serial number 91133001, filed on Nov. 11, 2002.

BACKGROUND OF THE INVENTION

1. Field of the Invention

The present invention relates in general to a liquid crystal display (LCD) device integrating driving circuit on an active-matrix substrate. In particular, the present invention relates to a liquid crystal display device with low parasitical capacitance from clock lines.

2. Description of the Related Art

Liquid crystal display (LCD) devices are a well-known form of flat panel display with advantages of low power consumption, lightweight, thin profile, and low driving voltage. Generally, in the LCD, a liquid crystal layer is sandwiched between two transparent substrates such as glass substrates, one of which is provided with switching devices, such as thin film transistors (TFTs). In the display area of the LCD, an array of pixel areas is defined by horizontally extending gate lines and vertically extending data lines. Each pixel area has a thin film transistor and a pixel electrode.

An active matrix liquid crystal display used for a liquid crystal display with large area and high resolution includes pixel driving TFTs to drive display pixels and driver circuit TFTs for applying signals to gate lines and data lines coupled to the pixel driving TFTs. In general, there are two types of driver circuit unit. The first one embodies the driver circuit unit as a separate integrated circuit to drive signal lines, and the integrated circuit attached to one end of the substrate of the liquid crystal panel. In the second type, the driver circuit unit is formed on an LC panel as one piece. In the second type, typically, complementary metal oxide semiconductor thin film transistors (CMOS TFTs) using polycrystalline silicon (p-Si) with a high electric field effect mobility have been used for the driver circuit. Because the driver circuit TFTs and the pixel driving TFTs may be fabricated at the same time, the fabrication cost can be reduced.

However, the liquid crystal display device integrating driving circuit on an active-matrix substrate has a disadvantage of significant parasitic capacitance in the driver circuit region.

In order to solve this problem, U.S. Pat. No. 6,177,916 discloses a liquid crystal display device having a counter substrate without extending to the driver circuit region, such that the circuit on the matrix substrate of the driver circuit region cannot induce parasitic capacitance with the common electrode on the counter substrate.

However, with flat display panels getting larger, if the area of the matrix substrate is larger than that of the counter substrate, when backend module process is performed, the stress exerted on the flat display panel easily concentrates on the matrix substrate but is not evenly distributed, and the probability of panel damage increases.

SUMMARY OF THE INVENTION

It is therefore an object of the present invention to provide a liquid crystal display device integrating driving circuit on an active-matrix substrate to eliminate parasitic capacitance between the clock line and the common electrode.

In order to achieve the foregoing objects, the present invention is provides an active-matrix substrate with a clock line disposed thereon, a counter substrate provided opposite the matrix substrate with a gap, and a common electrode disposed on the counter substrate, the common electrode having an opening slit corresponding to the clock line.

The above-mentioned liquid crystal display further comprises a liquid crystal layer disposed between the matrix substrate and the counter substrate, wherein the clock line and the common electrode are disposed on both sides of the liquid crystal layer respectively.

The above-mentioned liquid crystal display further comprises a liquid crystal layer disposed between the matrix substrate and the counter substrate, wherein the liquid crystal layer does not extend to the clock line.

BRIEF DESCRIPTION OF THE DRAWINGS

The preferred embodiment of the invention is hereinafter described with reference to the accompanying drawings in which.

DETAILED DESCRIPTION OF THE INVENTION

It is observed that the parasitic capacitance, produced from the circuit in the driver circuit region on the matrix substrate of a liquid crystal display integrated with a driver circuit, is primarily contributed by the parasitic capacitance between the clock lines and the common electrode disposed on the counter substrate. Consequently, the present invention provides a liquid crystal display without common electrodes on the clock lines to reduce consumption of power and improve operating speed while the matrix substrate and the counter substrate are substantially the same size.

Figure 1:
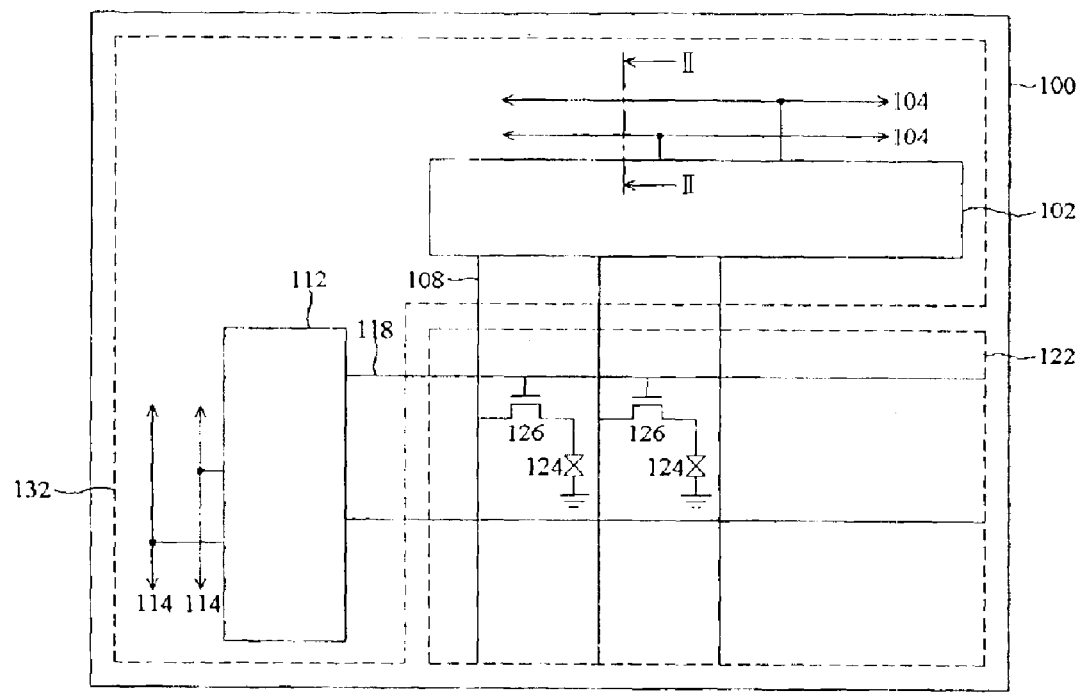
FIG. 1 is an equivalent circuit of a liquid crystal display panel with peripheral driver circuit.

FIG. 1 is an equivalent circuit diagram illustrating the liquid crystal display panel with peripheral driving circuit. An active-matrix substrate 100 of the liquid crystal display is divided into a pixel region 122 and a driver circuit region 132, in which the driver circuit region 132 includes an X driver circuit 102 and a Y driver circuit 112.

In the pixel region 122, each pixel comprises a liquid crystal cell 124 and a drive element, such as thin film transistor or diode. The diode used to form the drive element can be metal insulator metal diode (MIM diode). The liquid crystal cell 124 is composed of a pixel electrode, a common electrode and a liquid crystal layer therebetween. Gate lines of the thin film transistors 126 are coupled to the Y driver circuit 112, as are clock lines 114. Source lines 108 of the thin film transistors 126 are coupled to the X driver circuit 102, as are clock lines 104. The active matrix panel is then operated by applying a clock signal and a start signal to input terminals of X driver circuit 102. A clock signal and a start signal are input into a pair of input terminals of Y driver circuit 112, respectively.

Figure 2:
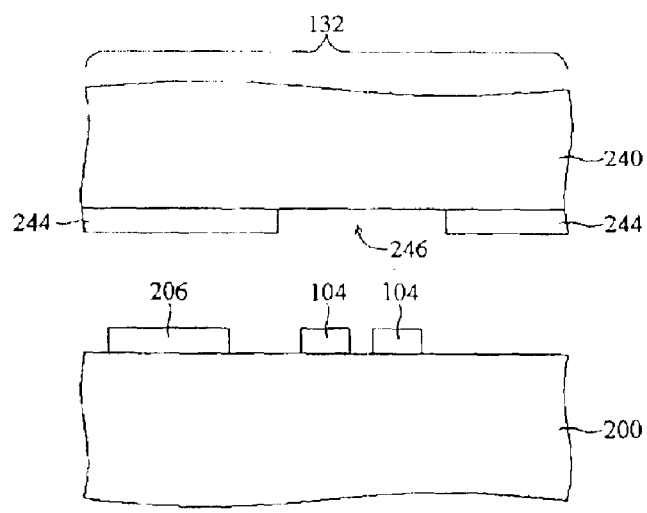
FIG. 2 is a cross section taken along cut line II—II in FIG. 1.

FIG. 2 shows a cross section taken along cut line II—II in FIG. 1. The liquid crystal display substantially comprises a substrate (also referred to as an active-matrix substrate) 200, clock lines 104, a counter substrate 240 and a common electrode 244. The clock lines 104 are disposed on the counter substrate 240 facing the matrix substrate 200, and the common electrode 244 has an opening slit 246 corresponding to the clock line 104 on the driver circuit region 132. A liquid crystal layer is disposed between the matrix substrate 200 and the counter substrate 240. The notation 206 in the figure indicates other conducting lines on the driver circuit region 132.

The common electrode 244 is almost same size as the counter substrate 240, that is, the common electrode 244 covers the whole counter substrate 240 except the area corresponding to the clock lines 104. This part of the common electrode 244 is removed by etching to reduce the parasitic capacitance between the clock lines 104 and the counter substrate 240. The common electrode 244 is a transparent electrode of, for example, indium tin oxide (ITO).

The liquid crystal layer disposed between the matrix substrate 200 and the counter substrate 240 can be extended to the clock lines 104 or not. A detailed description of the two structures is given hereafter accompanying with a specific liquid crystal display. The present invention is not, however, limited thereto, but encompasses a variety of liquid crystal display types.

First Embodiment

Figure 3:
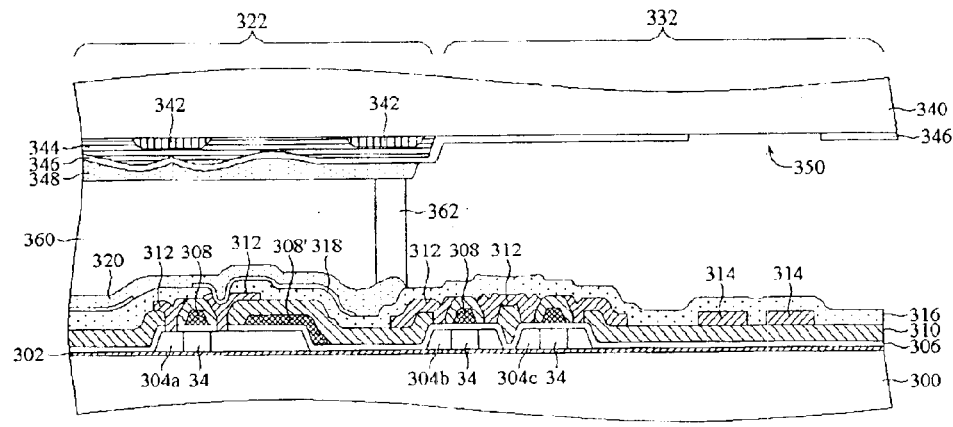
FIG. 3 is a cross section of the liquid crystal display integrated with a driver circuit according to a first embodiment of the present invention.

As shown in FIG. 3, a buffer layer 302 is provided on the substrate 300, and then polysilicon (p-Si) is deposited on the buffer layer 302 and patterned to form semiconductor layers 304a, 304b and 304c on the pixel region 322 and the driver circuit region 332. As a result, one semiconductor layer 304a is provided on the pixel region 322 and two semiconductor layers 304a and 304b are formed on the driver circuit region 332. The semiconductor layer 304a formed on the pixel region 322 is for a thin film transistor to drive the pixel. The semiconductor layers 304b and 304c are for NMOS and PMOS thin film transistors, respectively.

An insulating layer 306, such as $SiO_2$ or $SiN_x$, is disposed on the semiconductor layers 304a, 304b and 304c and the buffer layer 302, and functions as gate insulating layers and capacitor insulating layer. Gate electrodes 308 and electrode plate 308' of metal, are disposed on the insulating layer 306. One part of the semiconductor layer 304a disposed under the gate electrode 308 functions as channel 34, and the other parts are source and drain with n type lightly doped drain (LDD) structures on both sides of the channel 34 respectively.

An insulating layer 310, such as $SiN_x$ or $SiO_2$, is deposited on the insulating layer 306, the gate electrodes 308 and the electrode plate 308', that is, over the entire surface of the substrate 300 except contact holes. Conducting lines 312 and clock lines 314, of metal, are disposed on the insulating layer 310. The conducting lines 312 connect to the source and drain through the contact holes formed in the insulating layer 310 and 306. The material of the conducting lines 312 and the clock lines 314 can be Al.

A passivation layer 316, such as $SiN_x$, is disposed on the conducting lines 312, clock lines 314 and insulating layer 310. A pixel electrode 318 is disposed on the pixel region 322 of the passivation layer 316 and connects to the drain through contact holes in the passivation and the connecting lines 312. The pixel electrode 318 is a transparent electrode of, for example, indium tin oxide (ITO). An alignment film 320 is disposed on the pixel electrode 318 and the whole pixel region 322.

As for the counter substrate, black matrix (BM) 342 and color filter 344 are disposed on the counter substrate 340 of the pixel region 322. The counter common electrode 346 with an opening slit 350 corresponding to the clock lines 314 is substantially disposed on the whole counter substrate 340. An alignment film 348 is disposed on the common electrode 346 of the pixel region 322.

A liquid crystal layer 360 is disposed between the matrix substrate 300 and the counter substrate 340 and sealed by sealing material 362. The sealing material 362 is substantially located at the boundary between the pixel region 322 and the driver circuit region 332. In other words, the liquid crystal layer 360 does not extend to the clock lines 314.

Second Embodiment

Figure 4:
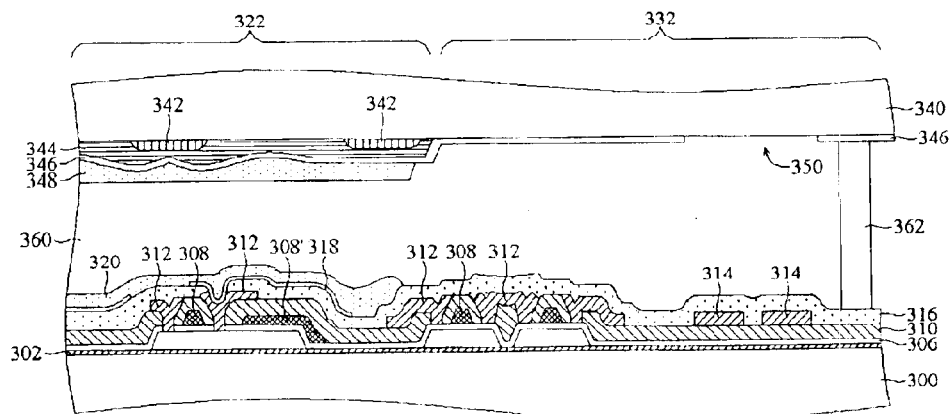
FIG. 4 is a cross section of the liquid crystal display integrated with a driver circuit according to a second embodiment of the present invention.

As shown in FIG. 4, a buffer layer 302 is provided on the substrate 300, and then polysilicon (p-Si) is deposited on the buffer layer 302 and patterned to form semiconductor layers 304a, 304b, and 304c on the pixel region 322 and the driver circuit region 332. As a result, one semiconductor layer 304a is provided on the pixel region 322 and two semiconductor layers 304a and 304b are formed on the driver circuit region 332. The semiconductor layer 304a formed on the pixel region 322 is for a thin film transistor to drive the pixel. The semiconductor layers 304b and 304c are for NMOS and PMOS thin film transistors, respectively.

An insulating layer 306, such as $SiO_2$ or $SiN_x$, is disposed on the semiconductor layers 304a, 304b and 304c and the buffer layer 302, and function as gate insulating layers and capacitor insulating layer. Gate electrodes 308 and electrode plate 308' of metal, are disposed on the insulating layer 306. One part of the semiconductor layer 304a disposed under the gate electrode 308 functions as channel 34, and the other parts are source and drain with n type lightly doped drain (LDD) structures on both sides of the channel 34 respectively.

An insulating layer 310, such as $SiN_x$ or $SiO_2$, is deposited on the insulating layer 306, the gate electrodes 308 and the electrode plate 308', that is, over the entire surface of the substrate 300 excluding the contact holes. Conducting lines 312 and clock lines 314, of metal, are disposed on the insulating layer 310. The conducting lines 312 connect to the source and drain through the contact holes formed in the insulating layer 310 and 306. The material of the conducting lines 312 and the clock lines 314 can be Al.

A passivation layer 316, such as $SiN_x$, is disposed on the conducting lines 312, clock lines 314 and insulating layer 310. A pixel electrode 318 is disposed on the pixel region 322 of the passivation layer 316 and connects to the drain through contact hole in the passivation and the connecting lines 312. The pixel electrode 318 is a transparent electrode of, for example, indium tin oxide (ITO). An alignment film 320 is disposed on the pixel electrode 318 and on the whole pixel region 322.

As for the counter substrate, black matrix (BM) 342 and color filter 344 are disposed on the counter substrate 340 of the pixel region 322. The counter common electrode 346 with an opening slit 350 corresponding to the clock lines 314 is substantially disposed on the whole counter substrate 340. An alignment film 348 is disposed on the common electrode 346 of the pixel region 322.

A liquid crystal layer 360 is disposed between the matrix substrate 300 and the counter substrate 340 and sealed by sealing material 362. The sealing material 362 is substantially located outside the pixel region 322 and the driver circuit region 332. In other words, the liquid crystal layer 360 extends to the clock lines 314, and the clock lines 314 and the common electrode 346 are disposed on both sides of the liquid crystal layer 360.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A liquid crystal display device, comprising:
   an active-matrix substrate;
   a clock line disposed on the matrix substrate;
   a counter substrate separated from the matrix substrate by a gap; and
   a common electrode disposed on the counter substrate, the common electrode having an opening slit corresponding to the clock line.

2. The liquid crystal display device as claimed in claim 1, wherein the common electrode is a transparent electrode of indium tin oxide (ITO).

3. The liquid crystal display device as claimed in claim 1, wherein a width of the opening slit is greater than that of the clock line.

4. The liquid crystal display device as claimed in claim 1, further comprising a liquid crystal layer disposed between the matrix substrate and the counter substrate, wherein the clock line and the common electrode are disposed on both sides of the liquid crystal layer respectively.

5. The liquid crystal display device as claimed in claim 4, further comprising a first alignment film disposed between the liquid crystal layer and the matrix substrate and a second alignment film disposed between the liquid crystal layer and the common electrode.

6. The liquid crystal display device as claimed in claim 1, further comprising a liquid crystal layer disposed between the matrix substrate and the counter substrate, wherein the liquid crystal layer does not extend to the clock line.

7. The liquid crystal display device as claimed in claim 6, further comprising a first alignment film disposed between the liquid crystal layer and the matrix substrate and a second alignment film disposed between the liquid crystal layer and the common electrode.

8. The liquid crystal display device as claimed in claim 1, wherein the common electrode is a transparent electrode of indium tin oxide (ITO).

9. A liquid crystal display (LCD) device, comprising:
   an active-matrix substrate having a pixel region and a driver circuit region;
   a counter substrate;
   a liquid crystal layer disposed between the matrix substrate and the counter substrate and disposed on the pixel region;
   a clock line disposed on the driver circuit region of the matrix substrate;
   a common electrode disposed between the counter substrate and the liquid crystal layer, the common electrode having an opening slit corresponding to the clock line.

10. The liquid crystal display device as claimed in claim 9, wherein a width of the opening is greater than that of the clock line.

11. The liquid crystal display device as claimed in claim 9, wherein the liquid crystal layer extends to the driver circuit region, and the clock line and the common electrode are disposed on both sides of the liquid crystal layer respectively.

12. The liquid crystal display device as claimed in claim 9, further comprising a first alignment film disposed between the liquid crystal layer and the matrix substrate and a second alignment film disposed between the liquid crystal layer and the common electrode.

13. The liquid crystal display device as claimed in claim 9, further comprising:
   a first NMOS thin film transistor and a PMOS thin film transistor disposed on the driver circuit region of the matrix substrate; and
   a second NMOS thin film transistor disposed between the liquid crystal layer and the matrix substrate and on the pixel region.

* * * * *